Oct. 10, 1967  V. L. YARBOROUGH  3,346,282
JUNCTION CLIP ARRANGEMENT FOR SECURING ANGULARLY
DISPOSED PANEL MEMBERS TOGETHER
Filed Sept. 8, 1964
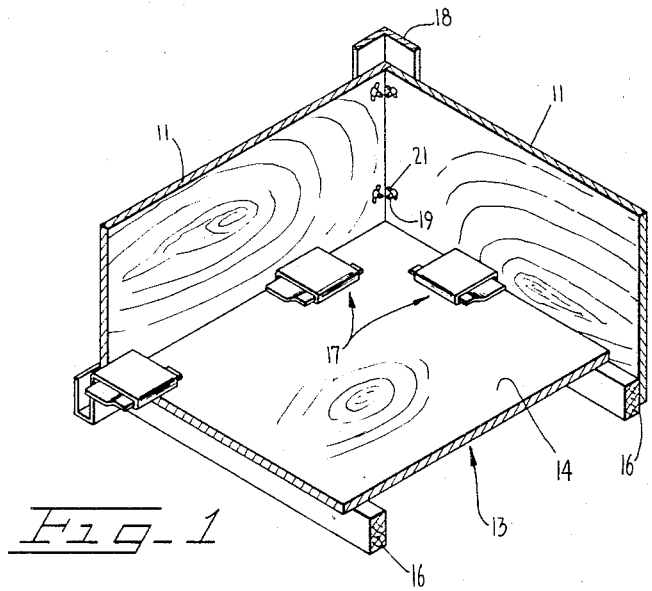
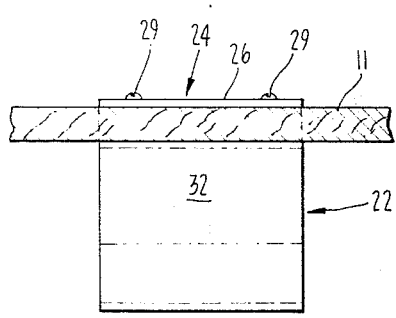
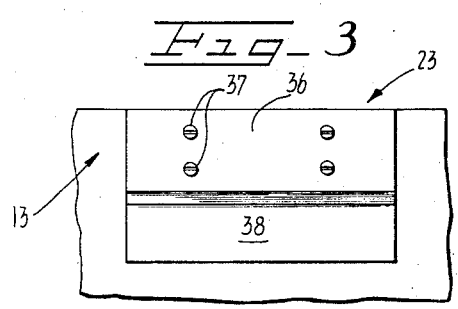
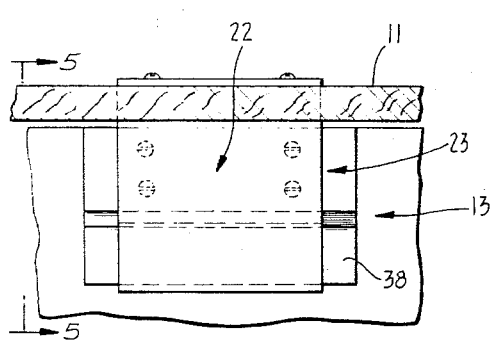
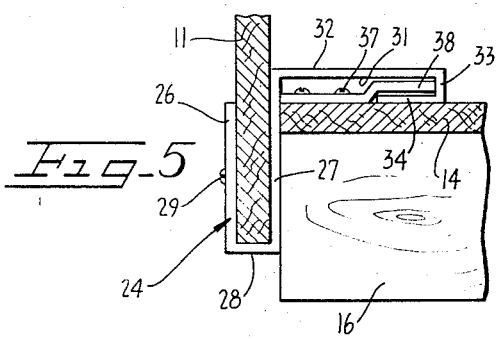
INVENTOR.
VIVVIEN L. YARBOROUGH
BY
Gardner & Zimmerman
ATTORNEYS

United States Patent Office 3,346,282
Patented Oct. 10, 1967

3,346,282
JUNCTION CLIP ARRANGEMENT FOR SECURING ANGULARLY DISPOSED PANEL MEMBERS TOGETHER
Vivvien L. Yarborough, 650 San Pablo Ave., Rodeo, Calif. 94572
Filed Sept. 8, 1964, Ser. No. 395,096
5 Claims. (Cl. 287—20.924)

This invention relates to fastener means for securing two angularly related panel members together, and is more particularly directed to a junction clip arrangement which facilitates the securance of modular wall panels to a floor panel, or of other angularly related panel members to each other, in a minimum of time and without requirement of tools.

In many applications it is desirable that angularly related panel members be securable in a minimum of time and with a minimum of effort. For example various modular building structures, such as small utility buildings, are advantageously erectable from panel members provided with interlocking fastener means for facilitating rapid direct on-the-spot securance of the panel members without necessitating the use of tools such as wrenches, screw drivers, or the like. Similarly, various knock-down containers are desirably constructable of panel members having detachably engageable fastener means for securing the panels together.

Although various fastener means have been heretofore provided for the foregoing purpose, such means have not been entirely satisfactory in simultaneously providing characteristics of rapid assembly and structural strength.

Accordingly, it is an object of the present invention to provide a junction clip arrangement for rapidly securing angularly disposed panel members together in a rigid structurally strong assembly.

Another object of the invention is the provision of a clip arrangement of the class described which is characterized by the ease of manipulation required to interlockingly assemble same to secure angularly disposed panel members together without requirement of auxiliary fasteners.

Still another object of the invention is the provision of a clip arrangement of the class described which may be readily disassembled to thereby facilitate rapid knock-down of a structure formed of panels secured together by the clip arrangement.

It is a further object of the invention to provide a clip arrangement of the class described which is of simple low cost construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a fragmentary perspective view of a structure formed of angularly related modular panel members secured together by junction clip arrangements in accordance with the present invention.

FIGURE 2 is a sectional view of a panel member of the structure of FIGURE 1 provided with a female clip of the junction arrangement.

FIGURE 3 is a plan view of a panel member of the structure of FIGURE 1, provided with a male clip of the junction arrangement.

FIGURE 4 is a composite of FIGURES 2 and 3, illustrating the female and male clips of the clip arrangement in interengagement to secure the panel members associated therewith in rigid angular assembly.

FIGURE 5 is a sectional view taken at line 5—5 of FIGURE 4.

Referring now to FIGURE 1, there is illustrated a portion of a utility building, container, or similar structure comprised of angularly related modular side panel members 11 and floor panel member 13, including panel 14 and joists 16 secured at spaced intervals to the underside thereof. These panel members are provided with junction clip arrangements 17, in accordance with the present invention, which facilitate the rapid on-the-spot securance of the panel members in a structurally strong self-supporting assembly without requirement of auxiliary tools. The clip arrangements are provided at spaced intervals adjacent the lower edges of the side panel members 11 and the corresponding marginal edges of the floor panel member 13, and the clip arrangements are self-interlocking to provide effective junctions between the side and floor panels. If desired, the rigidity of the structure may be enhanced by means of an angle member 18 in engagement with the corner intersection of the side panel members 11 and secured thereto with bolts 19 extending through the panel members and angle member and receiving wing nuts 21. By virtue of the wing nuts, the foregoing corner securance of the side panel members is accomplished without tools.

Considering now the self-interlocking clip arrangements 17 in greater detail, it is to be noted that each includes a female clip 22 (see FIGURE 2) secured to a side panel member 11 and a male clip 23 (see FIGURE 3) secured to the floor panel member 13. More particularly, the female clip 22 includes a saddle 24 of substantially right angular U-shaped configuration formed by parallel spaced legs 26, 27 interconnected at one end by a web 28 extending right angularly therefrom. The saddle is adapted to receive a side panel member 11, and in this regard the spacing between legs 26, 27 is made substantially equal to the thickness of the panel. The saddle of each female clip 22 is engaged upon the lower edge portion of a side panel member and is secured thereto as by means of wood screws 29 extending through side leg 26 and threaded into the panel member. This securance of the clips to the side panel members is accomplished at the factory, or elsewhere prior to the on-site erection of the panel members to form a structure.

Each female clip 22 is further provided with a channel 31. Preferably a flat leg portion 32 projects right angularly from leg 27 to the opposite side thereof from leg 26. The free end of leg portion 32 terminates in a right angularly depending web 33 which, in turn, terminates in a right angular reentrant flange 34 in parallel spaced subjacent relation to leg portion 32 to thereby define the channel 31 therebetween. It should be noted that the saddle 24 depends a substantial distance from the flat leg portion 32 so as to provide a relatively large area of bearing surface in engagement with the side panel members. However, the extent to which the saddle depends is less than the lower edges of the joists 16, or other lower-most surface portions of the floor member 13.

With the female clips 22 provided as just described, each male clip 23 includes a flat portion 36 adapted to be secured to the upper surface of floor member 13 adjacent a marginal edge thereof, as by means of wood screws 37. Each male clip is formed with a tongue 38 projecting from flat portion 36 in offset parallel relation thereto, so as to be upwardly spaced from the floor member. The tongue 38 is interlockingly engageable with the channel 31 of a female clip 22 (see FIGURES 4 and 5). In this regard, the tongue is engaged between the leg portion 32 and flange 34 of the female clip and abuts the web 33 thereof. The flange 34 is disposed in relatively close fitting relation within the slot defined between the tongue 38 and floor surface and abuts the offset between the tongue and secured portion 36. In addition, the leg 27 of the saddle 24 of the female clip abuts the adjacent side edge of the floor member. It will thus be appreciated that the spacing between leg portion 32 and flange 34 of a female clip is substantially equal to the thickness of the tongue 38 of a male clip. The length of the tongue is substantially equal to the inside length of the flange, and the offset of the tongue with respect to portion 36 of a male clip is substantially equal to the thickness of the flange of a female clip. The overall length of a male clip including the portion 36 and tongue 38 is substantially equal to the distance between the exterior face of leg 27 of the saddle and interior of the web 33 of a female clip.

With clip arrangement 17 provided in the manner described hereinbefore, including the female clips 22 presecured to the side panels 11 and male clips 23 presecured to the floor member 13, it will be appreciated that the side panels may be secured in rigid assembly with the floor member in a matter of minutes to provide a utility building, container, or similar structure, without the aid of tools. More expressly, each side panel is placed right angularly adjacent the side edges of the floor member 13 with the female clips resting upon the upper surface thereof laterally adjacent the male clips. The side panel is then slid relative to the floor member to urge the tongues of the male members into the channels of the female members. The male and female clips are thus interlocked to rigidly secure the side panels and floor member together. Similarly, a top member may be provided with male clips, and the side panels provided with female clips adjacent their upper edges to facilitate securance of the top member in the structure. The side panels may of course be readily disassembled from the floor and/or top members upon moving the side panels to slide the female clips out of engagement with the male clips.

What is claimed is:

1. A clip arrangement for securing right angularly related panel members together comprising a female clip including a saddle having parallel spaced legs interconnected at one end by a web right-angularly extending therebetween, said saddle adapted to receive a first panel member, said female clip including a leg portion extending right-angularly from one of said legs of said saddle and terminating in a right angularly depending second web terminating in a reentrant right angular flange in parallel spaced subjacent relation to said leg portion to define a channel therebetween with the opening of said channel facing toward said saddle, and a male clip including a flat portion adapted for securance to a surface of a second panel adjacent a marginal edge of said second panel and a tongue projecting from said flat portion in offset parallel relation thereto so as to be in generally parallel relation to said surface of said second panel when said male clip is secured thereto, the free end of said tongue being adapted to extend in a direction inwardly of said marginal edge when said male clip is secured to said second panel, said tongue adapted to fit within and interlockingly engage said channel to provide a right angular, structurally strong securance of said second panel to said first panel.

2. A clip arrangement according to claim 1, further defined by said leg portion and flange of said female clip having a spacing substantially equal to the thickness of said tongue of said male clip, said tongue having a length substantially equal to the inside length of said flange, said tongue having an offset with respect to said flat portion substantially equal to the thickness of said flange, said male clip having an overall length substantially equal to the distance between the exterior face of said first leg of said saddle and interior of said second web.

3. In a structure having first and second panel members disposed in right angular relation, at least one female clip including a saddle having parallel spaced legs interconnected at one end by a web right-angularly extending therebetween and a leg portion extending right-angularly from one of said legs of said saddle and terminating in a right-angularly depending second web terminating in a reentrant right angular flange in parallel spaced subjacent relation to said leg portion to define a channel therebetween with the opening of said channel facing toward said saddle, said first panel member received by the saddle of each female clip and secured thereto, and at least one male clip including a flat portion secured to a surface of said second panel adjacent an edge thereof and a tongue projecting from the flat portion in offset parallel relation thereto so as to be in generally parallel relation to said surface of said second panel, the free end of said tongue extending in a direction inwardly from said edge, said tongues of said male clips respectively fitting within and interlockingly engaging said channels of said female clips with the saddles of said female clips abutting said edge of said second panel member to provide a structurally strong securance of said second panel to said first panel.

4. A clip arrangement for securing right angularly related panel members together comprising a female clip including a saddle for receiving a first panel member, and a channel projecting right angularly from said saddle, the opening of said channel facing toward said saddle; and a male clip including a flat portion adapted for securance to the surface of a second panel adjacent a marginal edge of said second panel, and a tongue projecting from said flat portion in offset parallel relation thereto so as to be in generally parallel relation to said surface of said second panel when said male clip is secured thereto, the free end of said tongue being adapted to extend in a direction inwardly of said marginal edge when said tongue is secured to said second panel, and said tongue being adapted to fit within and interlockingly engage said channel to provide a right angular, structurally strong securance of said second panel to said first panel.

5. In a structure having first and second panel members disposed in right angular relation, at least one female clip including a saddle receiving said first panel and secured thereto, and a channel projecting right angularly from said saddle, the opening of said channel facing toward said saddle; and at least one male clip including a flat portion secured to a surface of said second panel adjacent a marginal edge thereof, and a tongue projecting from said flat portion in offset parallel relation thereto so as to be in generally parallel relation to said surface of said second panel, the free end of said tongue extending in a direction inwardly of said marginal edge, said tongues of said male clips respectively fitting within and interlockingly engaging said channels of said female clips to provide a structurally strong securance of said second panel to said first panel.

References Cited

UNITED STATES PATENTS

| | | | |
|---|---|---|---|
| 865,152 | 9/1907 | Arcoren | 287—20.92 |
| 1,571,601 | 2/1926 | Richards | 287—20.92 |
| 1,940,086 | 12/1933 | Hansen | 287—20.92 |
| 2,867,302 | 1/1959 | Miller | 52—285 |
| 2,993,637 | 7/1961 | Lacey | 52—285 |

JOHN E. MURTAGH, *Primary Examiner.*

R. A. STENZEL, *Assistant Examiner.*